United States Patent [19]

Reinhardt

[11] Patent Number: 4,541,841
[45] Date of Patent: Sep. 17, 1985

[54] METHOD FOR CONVERTING CARBON-CONTAINING RAW MATERIAL INTO A COMBUSTIBLE PRODUCT GAS

[75] Inventor: Dieter Reinhardt, Erlangen, Fed. Rep. of Germany

[73] Assignee: Kraftwerk Union Aktiengesellschaft, Mühlheim, Fed. Rep. of Germany

[21] Appl. No.: 504,132

[22] Filed: Jun. 15, 1983

[30] Foreign Application Priority Data

Jun. 16, 1982 [DE] Fed. Rep. of Germany ....... 3222653

[51] Int. Cl.$^4$ ............................................... C10J 3/46
[52] U.S. Cl. .................................... 48/197 R; 48/202; 48/209; 48/214 A
[58] Field of Search ............. 48/202, 206, 209, 214 A, 48/197 R

[56] References Cited

U.S. PATENT DOCUMENTS 2,694,624 11/1954 Sweetser ............................... 48/206

FOREIGN PATENT DOCUMENTS

| 1124521 | 6/1982 | Canada . | |
|---|---|---|---|
| 1943080 | 8/1969 | Fed. Rep. of Germany | 48/202 |
| 2530600 | 1/1977 | Fed. Rep. of Germany | 48/202 |
| 716740 | 10/1954 | United Kingdom | 48/202 |

*Primary Examiner*—Jay H. Woo
*Assistant Examiner*—Joye Woodard
*Attorney, Agent, or Firm*—Herbert L. Lerner; Laurence A. Greenberg

[57] ABSTRACT

Converting carbon-containing raw material, particularly coal, wood or crude oil, into a combustible product gas by a gasification reaction in the presence of a catalyst which is dissolved in the steam intended for the gasification reaction, forming a homogeneous gaseous solution. The ash-containing gasification residue is separated and the catalyst is extracted from the separated gasification residue by the steam intended for the gasification reaction at a temperature and a pressure, at which a homogeneous gaseous solution of the catalyst in steam is formed.

9 Claims, 1 Drawing Figure

U.S. Patent  Sep. 17, 1985  4,541,841
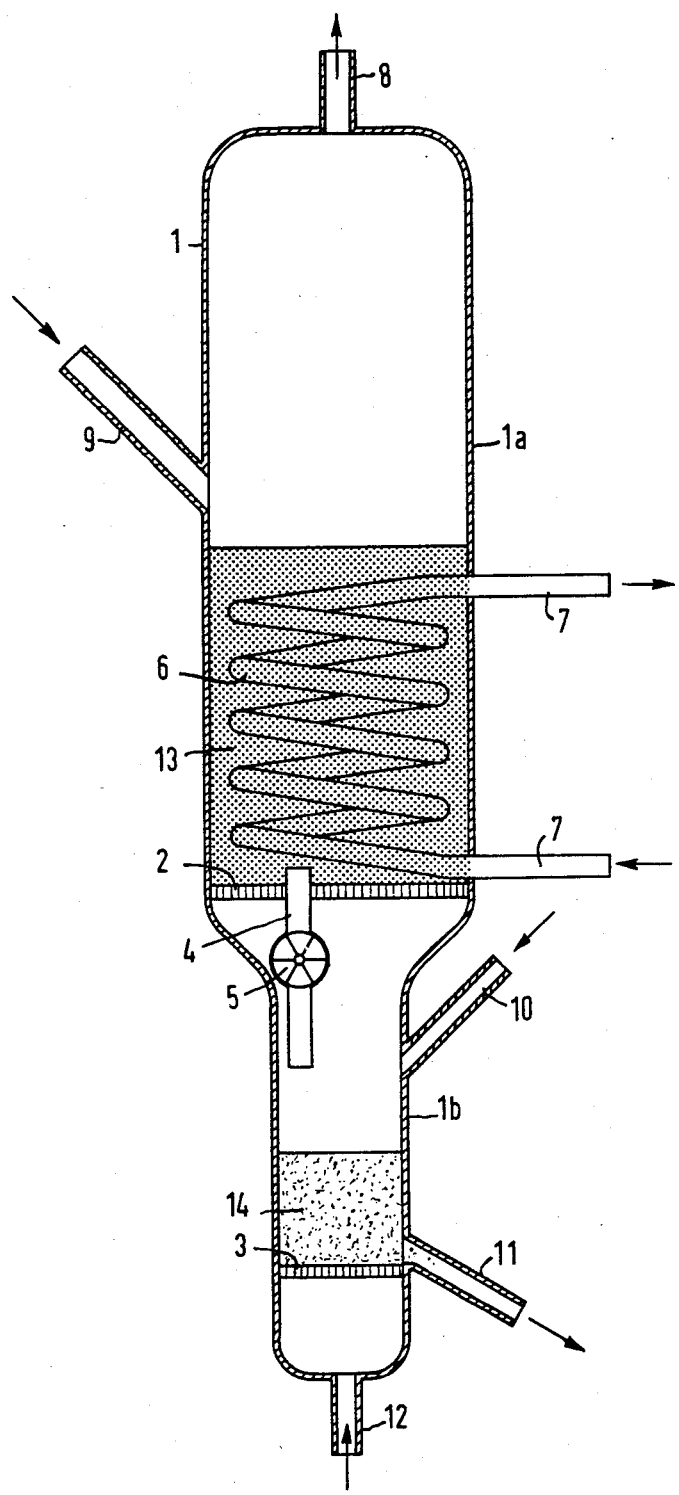

METHOD FOR CONVERTING CARBON-CONTAINING RAW MATERIAL INTO A COMBUSTIBLE PRODUCT GAS

BACKGROUND OF THE INVENTION

1. Field of the Invention

The invention relates to a method for converting carbon-containing raw material, particularly coal, wood or crude oil, into a combustible product gas by a gasification reaction with steam in the presence of a catalyst, which is dissolved in the steam intended for the gasification reaction, forming a gaseous homogeneous solution.

2. Description of the Prior Art

A method of this type is described in German Offenlegungsschrift No. 28 17 835 (Canadian Patent No. 11 24 521). According to this known method, steam in which the catalyst is homogeneously dissolved as a gas for improving the effectiveness the steam, is fed to a reaction vessel containing powdered coal or powdered coke. The reaction pressure in the reaction vessel is approximately in the range of 60 bar to 140 bar, while the reaction temperature is about 800° C. to 850° C. Alkali chlorides and alkali carbonates are used as the catalyst.

In the reaction vessel, gasification of carbon into carbon monoxide and hydrogen takes place according to the overall reaction equation $C + H_2O = CO + H_2$; a conversion of carbon monoxide into carbon dioxide and hydrogen according to the overall reaction equation $CO + H_2O = CO_2 + H_2$ and finally, methanization of carbon monoxide into methane and water according to the overall reaction equation $CO + 3H_2 = CH_4 + H_2O$. This reaction cycle is endothermic overall. The catalyst not only accelerates the gasification, but also the adjustment of the conversion and methanization equilibrium.

The product gases hydrogen, carbon monoxide, carbon dioxide and methane as well as unreacted water leave the reaction vessel. After the unreacted water is condensed, this gas mixture can be further processed into synthesis gas, hydrogen gas or natural-gas substitute gas.

To generate the steam with a gaseous catalyst which is dissolved homogeneously, steam with a temperature of about 500° to 800° C. and an initial pressure of about 300 bar to 500 bar is produced from a dilute aqueous solution of the catalyst and expanded into the reaction device to the reaction pressure of 60 bar to 140 bar.

If the catalyst-containing steam with the relatively high initial pressure is produced from the aqueous solution of the catalyst in a steam generator, there is the danger of considerable corrosive action of the catalyst on the material of the steam generator. Furthermore piping of the steam generator would quite likely get clogged up because the impurities of the catalyst which are insoluble in steam, deposit on the wall of the pipes in the manner of boiler scale.

SUMMARY OF THE INVENTION

It is an object of the invention to improve this known method and to avoid the generation of catalyst-containing steam with high inlet pressure for introduction into the reaction chamber.

With the foregoing and other objects in view, there is provided in accordance with the invention a method for converting carbon-containing raw material, particularly coal, wood and crude oil, by passing a catalyst in steam in contact with the carbon-containing raw material in a first zone to effect a gasification reaction promoted by the catalyst and produce a combustible product gas together with a gasification residue containing ash, catalyst and unreacted carbon, the combination therewith of moving the gasification residue to a separate second zone, passing steam in contact with the separated gasification residue while maintaining a temperature and a pressure in the second zone at which a homogeneous gaseous solution of the catalyst in the steam forms to extract the catalyst from the residue, and utilizing the homogeneous gaseous solution from the gasification residue as the catalyst-steam mixture passing in contact with the carbon-containing raw material in the first zone.

Other features which are considered as characteristic for the invention are set forth in the appended claims.

Although the invention is illustrated and described herein as embodied in a method for converting carbon-containing raw material into a combustible product gas, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, which diagrammatically illustrates apparatus for carrying out the method in accordance with the invention. The reaction chamber is a vertical elongated cylinder with an upper two-thirds section which could be designated the reaction chamber proper of greater diameter than the lower section of smaller diameter which could be designated separated ash and catalyst recovery section. The raw carbon-containing feed enters through a stub in the side of the upper chamber to form a fluidized bed resting on a screen near the bottom of the upper chamber. Since the reaction in the reaction chamber proper is endothermic, a heating oil is embedded in the fluidized bed to maintain it at reaction temperature. The raw product gas is released through a conduit from the top of the chamber. A discharge tube has one end extending through the screen in the fluidized bed and the other end terminating in the lower chamber. A cellular wheel sluice controls the amount and timing of fluidized bed material, principally ash, with a minor amount of unreacted carbon and catalyst, which passes from the upper section to the lower section. The lower chamber also has a screen to support a fluidized bed of ash. An opening for discharge of the ash is provided. Steam is introduced into the bottom of the lower section to extract the catalyst from the ash and carry it to the upper bed, and to be a reactant and to fluidize the beds. Air or oxygen may be introduced concurrently, intermittently or alternately with the steam to burn the unreacted carbon in the ash. Additional carbon-containing material and also make-up catalyst may be added to the lower section through a stub.

DETAILED DESCRIPTION OF THE INVENTION

According to the invention, a method of the type mentioned at the outset for overcoming the difficulties relating to the catalyst features that ash-containing gasification residue is separated and that the catalyst is extracted from the separated gasification residue at a temperature and a pressure, at which a homogeneous gaseous solution of the catalyst in the steam is formed.

The solubility of the catalyst in the steam is considerably greater thereby than the partial vapor pressure of the catalyst without the presence of $H_2O$. This obviates the need for generating the steam which is intended for the gasification reaction. This steam is loaded with catalyst and the steam has an inlet pressure which is considerably above the reaction pressure. Also, not needed, of course, is a steam generator required for this purpose as well as of the associated pumps and piping, which equipment must be fabricated to withstand this substantially higher inlet pressure and increased corrosion attack. Also eliminated are the subsequent expansion of the steam, the cooling-off in the reaction vessel connected therewith due to the Joule-Thomson effect and the precipitation of catalyst in the piping of the steam generator. Since the catalyst accumulates in the ash-containing gasification residue, the recovery and recycling of the catalyst is taken care of in a particularly simple manner, which is particularly cost-effective because efficient catalysts represent a considerable cost factor in catalytic coal gasification. Also, particularly high purity requirements for the catalyst are not necessary. In addition, wet chemical reprocessing of the catalyst is no longer necessary.

It is advantageous to heat up the ash-containing gasification residue after it is separated. Thereby, the solubility of the catalalyst in the steam intended for the gasification reaction and thereby also the catalyst concentration and the reaction rate of the gasification reaction in the reaction vessel can be increased considerably.

The method is advantageously simplified still further if the gasification reaction, the separation of the ash-containing gasification residue and the extraction of the catalyst from the ash-containing gasification residue is carried out in the same pressure vessel.

It is further advantageous to add an additive to the ash-containing gasification residue after their separation, to reactivate part of the catalyst which may be inactivated.

The invention and its advantages will be explained in the following in greater detail.

Referring to the drawing, a reaction vessel 1 for a method according to the invention is shown schematically. The reaction vessel 1 has the shape of a hollow cylinder and is mounted with the longitudinal axis vertical. It is closed off gastight at both end faces and is tapered in the lower third, forming a longer upper part 1a with a larger diameter and a lower part 1b with a smaller diameter. At the lower end of the upper part 1a is arranged a screen sheet 2 located in a cross section of the upper part 1a. Near the lower end of the lower part 1b is a lower screen sheet 3 which is located in a cross section of this lower part 1b.

A discharge tube 4 open at both ends with a cellular wheel sluice 5 which establishes the connection between the parts 1a and 1b of the reaction vessel 1 through the upper screen sheet 2 is brought through the upper screen sheet 2. A heat exchanger 6 consisting of a tube coil within the reaction vessel 1 is arranged between the upper screen sheet 2 and the upper end of the reaction vessel part 1a. The two connecting pipes 7 of heat exchanger 6 through which, for instance hot helium flows are located outside the reaction vessel 1.

A gas outlet stub 8 for raw product gas is at the upper end of the upper part 1a at the end face of the reaction vessel 1. A charging stub 9 for feeding carbon-containing raw material is connected at about the middle of the upper part 1a of the reaction vessel 1. The tube coil of the heat exchanger 6 is located between the charging stub 9 and the upper screen sheet 2.

A charging stub 10 opens near the taper point at the upper end of the part 1b of the reaction vessel 1. Between this charging stub 10 and the lower screen sheet 3 in the lower part 1b of the reaction vessel 1 is arranged an ash discharge stub 11 with an opening just above the lower screen sheet 3, which latter is in the lower part 1b of the reaction vessel 1.

The lower end of the reaction vessel 1 and therefore the lower part 1b of the reaction vessel 1, is closed gastight, except for a gas inlet stub 12 for steam and also air or oxygen when needed. A continuous gasification reaction is maintained in the reaction vessel 1 in the following manner:

Powdered hard coal is continuously fed-in through the feed stub 9. The coal is fluidized above the upper screen sheet 2 by blowing steam containing $O_2$ through the gas inlet stub 12 to form a fluidized layer 13. A temperature of about 700° C. is set in the fluidized bed 13 by supplying thermal energy via the heat exchanger 6. The fluidized layer 13 is the reaction location or gasification zone wherein the charged-in coal entering through feed stub 9 is subjected to the gasification reaction with the generation of product gas which flows from the reaction vessel 1 through the discharge stub 8 and is subjected to further processing steps. The gasification also leaves a gasification residue with a residual carbon content of about 5 to 15%, rich in ash and catalyst. The gasification residue is continuously drawn off from fluidized bed 13 through discharge tubes into the lower part of the reaction vessel 1b via the cellular wheel sluice 5, set to a mass flow adjusted to the progress of the reaction of the carbon in the fluidized layer 13. The gasification residue collects on screen 3 in the lower part of vessel 1b. The steam containing $O_2$ entering through the gas inlet stub 12 fluidizes this gasification residue collected on screen 3 as a fluidized bed 14. In this fluidized bed 14, which is an extraction location or zone for the catalyst, physically separated from the reaction location or gasification zone, an exothermic chemical reaction takes place between the carbon-containing gasification residue and the $O_2$. This exothermic reaction is also catalyzed by the catalyst present and is adjusted by dosing the $O_2$ fed-in through the gas inlet stub 12, such that the fluidized bed 14 is increased to a temperature of about 900° C. Advantageously, the consumption of oxygen gas can be reduced if the oxygen gas flowing-in through the gas inlet stub 12 is preheated. Ash largely depleted of carbon and catalyst is removed from the fluidized bed 14 via the discharge stub 11. The steam flowing-in through the gas inlet stub 12 extracts the catalyst from the gasification residue in fluidized bed 14 and transports it, homogeneously dissolved in gas form in the steam, into the fluidized bed 13, where the catalytic gasification reaction of the hard coal with the steam proceeds. In this manner, the catalyst is continuously recycled in the reaction vessel 1.

To obtain good extraction of catalyst from the residue, the temperature desirably is above 850° C., preferably between 850° and 900° C., and especially between 875° C. and 925° C. The pressure should be above 60 bar, preferably from 60 to 150 bar. Such pressure should be above the gasification pressure to permit ready introductions therein without the use of blowers.

To increase the heat supply to the lower fluidized bed 14, part of the hot product gas can be fed back from the discharge stub 8 through the gas inlet stub 12 into the reaction vessel 1 to react therein with the $O_2$ entering with the steam. The sensible heat as well as the heat of combustion of the product gas contributes to the maintenance of the temperature of the fluidized bed 14. Additionally, carbn-containing raw material which reacts with the $O_2$ in the steam containing $O_2$, can also be added to the ash-containing gasification residue through the feed stub 10 to maintain the temperature in the fluidized bed 14.

The amount of catalyst homogeneously dissolved in gaseous form in the steam flow within the fluidized bed 14 can advantageously be increased if a gas mixture containing steam and $O_2$ is blown into the reaction vessel 1 through the gas inlet stub 12 not continuously, but if alternatingly steam which does not contain $O_2$ and $O_2$-containing gas which contains no steam is blown into the reaction vessel 1 through the gas inlet stub 12. Thereby, the ash-containing gasification residue is alternatingly brought into contact in the fluidized bed 14 with the steam intended for the gasification reaction and the $O_2$. In this manner, the steam can be made available in the fluidized layer 14 with increased partial pressure, so that the solubility of the catalyst in the fluidized bed 14 in the steam is also increased.

Particularly well suited as catalysts for a catalytic gasification process are carbonates, hydroxides and halogenides of the alkali metals and/or oxides, hydroxides and halogenides of alkaline earth metals, iron, nickel and cobalt.

Catalyst losses can be made up by feeding-in catalyst through the feed stub 10. It is of advantage if an additive, by means of which the catalyst in the ash-enriched fluidized layer 14 is reactivated, is added through the feed stub 10 to the ash-containing gasification residue continuously or batch-wise. Such a substance may be, for instance, calcium carbonate or dolomite $CaCO_3 \cdot MgCO_3$ which releases that part of the catalyst cations which were bound and inactivated by reaction with the acid components of the ash.

The heat exchanger 6 in the reaction vessel 1 can also be replaced by a gas inlet stub for $O_2$-containing gas, not shown in the drawing, at the cylinder shell of the reaction vessel 1 above the upper screen sheet 2. $O_2$ blown into the fluidized bed 13 through this gas inlet stub, not shown, can supply at least part of the reaction heat required for the catalytic gasification reaction in the fluidized bed 13 due to an endothermic chemical reaction with carbon contained in the fluidized bed 13.

Conventional cyclone separators, not shown in the drawing, which advantageously take care of feeding-back fine material discharged from the two fluidized beds 13 and 14 into the respective fluidized beds, may additionally be provided. One cyclone separator may be located inside the reaction vessel 1 between the upper screened sheet 2 and, approximately, the upper end of the part 1b of the reaction vessel 1 and will function to return fine particles of gasification residue and ash entrained in the uprising fluidizing gas to the fluidized bed 14. The other cyclone separator is advantageously located outside the reaction vessel 1 and is connected with its gas inlet stub to the gas outlet stub 8 of the reaction vessel 1. Its discharge bin for the fine material is connected to the inlet stub 9 of the reaction vessel 1, so that the separated fine material is transported back into the fluidized bed 13 in the upper part 1a of the reaction vessel 1 with the larger diameter.

EMBODIMENT EXAMPLE 1

In a reaction vessel with two screen sheets arranged on top of each other as illustrated in the drawing, hard-coal coke with a grain size of 0.8 to 1.1 mm is brought into reaction in a fluidized bed with steam at a temperature of 700° C. and a pressure of 60 bar. The steam, to which a small amount of oxygen is added, flows first from beneath the lower screen sheet through a fluidized layer of gasification residue, the amount of which corresponds approximately to one-quarter of the coal input. This gasification residue comes from a catalytic steam gasification reaction of the mentioned coke. An elemental analysis gives the following composition of the gasification residue: C, 17.8% by weight (partly pesent as elemental carbon, partly as carbonate); $K_2O$, 25.8%; $Na_2O$, 0.8%; $SiO_2$, 20.4%; $Al_2O_3$, 15.3%; $Fe_2O_3$, 11.1%; $CaO$, 1.0%; $MgO$, 0.9%; $P_2O_5$, 0.4%; $SO_3$, 1.5%; $TiO_2$, 0.7%; Cl, 0.1%.

In addition, 0.1 kg lime ($CaCO_3$) was added per kg of gasification residue. The added quantity of oxygen was adjusted so that a locally averaged temperature of 860° to 880° C. is maintained in the lower fluidized layer by combustion of residual carbon contained in the gasification residue. After flowng through the upper screen sheet, the steam which has been loaded with catalyst in this lower fluidized bed, reacts with the fluidized hard coal coke present there. At the start of the test, and after the test parameters are set, the reaction rate is initially 0.12% C/minute and increases in the course of one hour to the value 0.74% C/min. After the unreacted steam is condensed, a gas with the mean composition $CH_4$, 6%; $H_2$, 62%; $CO_2$, 29% and CO, 4% remains.

By way of comparison, with the same coke under the same conditions, but without the presence of gasification residue on the lower screen sheet of the same reaction vessel, a nearly constant reaction rate of 0.11 to 0.15% C/min was found. In this case, the product gas composition was, after condensation of the unreacted steam: $CH_4$, 7%; $H_2$, 56%; CO, 20%, $CO_2$, 17%.

EMBODIMENT EXAMPLE 2

In the same reaction vessel, the same hard coal coke as in Embodiment Example 1 is brought to reaction with steam. The other test parameters such as coke input, steam flow, pressure and temperature of the gasification reaction are likewise chosen as in Embodiment Example 1. Also the gasification residue, which stems from the same charge as in Embodiment Example 1, and the lime are used in the same amount. Contrary to Embodiment Example 1, however, the lower fluidized bed consisting of said gasification residue is set to a locally averaged temperature of 890° to 900° C. After the test conditions are set, the reaction rate is 0.14% C/min and rises within the course of an hour to the value 1.68% C/min. After condensation of the unreacted steam, a gas with the average composition: $CH_4$, 6%; $H_2$, 60%; $CO_2$, 31%; CO, 3% remains. By way of comparison, with the same coke under the same conditions, but without the presence of gasification residue on the lower screen sheet of the same reaction vessel, a constant reaction rate of 0.14 to 0.17% C/min is obtained.

The foregoing is a description corresponding, in substance, to German application Pat. No. 32 22 653.5, dated June 16, 1982, international priority of which is being claimed for the instant application. Any material discrepancies between the foregoing specification of the aforementioned corresponding German application are to be resolved in favor of the latter.

There are claimed:

1. In a method for converting carbon-containing raw material, particularly coal, wood and crude oil, by passing a catalyst in steam in contact with the carbon-containing raw material in a first zone maintained by externally applied heat to effect a gasification reaction which is endothermic overall and promoted by said catalyst to produce a combustible product gas together with a gasification residue containing principally ash, and a minor amount of catalyst and unreacted carbon, the combination therewith of moving the gasification residue to a separate, exothermic second zone maintained as a separate fluidized bed having a higher temperature than said first zone, and passing steam free of the catalyst upward and in contact with the separated gasification residue as said fluidized bed while maintaining a temperature and a pressure in the second zone at which a homogeneous gaseous solution of the catalyst in the steam forms to extract the catalyst from the residue, and feeding said homogeneous gaseous solution from the gasification residue as the catalyst-steam mixture passing in contact with the carbon-containing raw material in the first zone.

2. Method according to claim 1, wherein the ash-containing gasification residue is maintained at said higher temperature by feeding-in product gas into the second zone.

3. Method according to claim 1, wherein the ash-containing gasification residue is maintained at said higher temperature auto-thermically by feeding-in oxygen into the second zone.

4. Method according to claim 3, wherein the oxygen-containing gas is peheated before feeding into the second zone.

5. Method according to claim 3, wherein the steam and oygen-containing gas are brought into contact alternatingly with the gasification residue.

6. Method according to claim 1, wherein carbon-containing raw material is added to the gasification residue in the second zone.

7. Method according to claim 1, wherein that the gasification reaction, the separation of the ash-containing gasification residue and the extraction of the catalyst from the gasification residue are carried out in a single reaction vessel.

8. Method according to claim 1, wherein the catalyst is a member of the group consisting of an alkali metal carbonate, hydroxide, oxide and halide and an oxide, hydroxide and halide of an alkaline earth metal, iron, nickel and cobalt.

9. Method according to claim 1, wherein an additive to reactivate the catalyst is added to the gasification residue after the separation.

* * * * *